United States Patent
Kim

(10) Patent No.: US 10,661,773 B2
(45) Date of Patent: May 26, 2020

(54) BRAKING APPARATUS AND BRAKING CONTROL METHOD OF VEHICLE

(71) Applicant: Hyundai Mobis Co., Ltd., Seoul (KR)

(72) Inventor: Jong Sung Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 226 days.

(21) Appl. No.: 15/907,822

(22) Filed: Feb. 28, 2018

(65) Prior Publication Data

US 2018/0370515 A1  Dec. 27, 2018

(30) Foreign Application Priority Data

Jun. 27, 2017  (KR) .................. 10-2017-0080904

(51) Int. Cl.

| B60T 13/74 | (2006.01) |
|---|---|
| B60T 13/14 | (2006.01) |
| B60T 13/66 | (2006.01) |
| B60T 7/04 | (2006.01) |
| B60T 8/40 | (2006.01) |
| B60T 13/68 | (2006.01) |
| B60T 13/12 | (2006.01) |

(52) U.S. Cl.
CPC ............ B60T 13/745 (2013.01); B60T 7/042 (2013.01); B60T 8/4072 (2013.01); B60T 8/4077 (2013.01); B60T 13/12 (2013.01); B60T 13/145 (2013.01); B60T 13/662 (2013.01); B60T 13/686 (2013.01)

(58) Field of Classification Search
CPC ...... B60T 13/745; B60T 13/145; B60T 7/042; B60T 13/12; B60T 13/662; B60T 13/686
See application file for complete search history.

(56) References Cited

U.S. PATENT DOCUMENTS

| 2004/0204283 | A1* | 10/2004 | Inoue | F16H 37/086 476/46 |
|---|---|---|---|---|
| 2008/0257670 | A1 | 10/2008 | Drumm et al. | |
| 2012/0192555 | A1* | 8/2012 | Hwang | B60T 1/10 60/552 |
| 2013/0086898 | A1* | 4/2013 | Yang | B60T 1/10 60/413 |
| 2013/0241272 | A1* | 9/2013 | Kim | B60T 13/147 303/6.01 |
| 2013/0241276 | A1* | 9/2013 | Kim | B60T 13/142 303/9.62 |

(Continued)

FOREIGN PATENT DOCUMENTS

KR  10-2008-0044300  5/2008

*Primary Examiner* — Mussa A Shaawat
(74) *Attorney, Agent, or Firm* — H.C. Park & Associates, PLC

(57) ABSTRACT

A braking apparatus of a vehicle may include: a first master cylinder configured to create hydraulic pressure as a brake pedal is pressed; a second master cylinder configured to create braking pressure through a piston which is pressed by the hydraulic pressure created by the first master cylinder and a nut moved by rotation of a motor; and a control unit, configured to: calculate a required displacement position of the nut based on a pedal stroke of the brake pedal, and update the required displacement position based on a displacement position of the nut at a dead stroke end point where the pedal stroke moves away from a dead stroke section of the first master cylinder.

10 Claims, 10 Drawing Sheets

(56) References Cited

U.S. PATENT DOCUMENTS

| | | | | |
|---|---|---|---|---|
| 2013/0320750 | A1* | 12/2013 | Kim | B60T 7/042 |
| | | | | 303/6.01 |
| 2016/0185329 | A1* | 6/2016 | Lee | B60T 8/4081 |
| | | | | 303/10 |
| 2016/0375775 | A1* | 12/2016 | Imanishi | B60L 7/18 |
| | | | | 701/70 |
| 2018/0094681 | A1* | 4/2018 | Reuss | F16D 65/18 |

* cited by examiner

BRAKING APPARATUS AND BRAKING CONTROL METHOD OF VEHICLE

CROSS-REFERENCES TO RELATED APPLICATION

This application claims priority from and the benefit of Korean Patent Application No. 10-2017-0080904, filed on Jun. 27, 2017, which is incorporated by reference for all purposes as if fully set forth herein.

BACKGROUND

Field

The present invention relates to a braking apparatus and a braking control method of a vehicle, and more particularly, to a braking apparatus and a braking control method of a vehicle, which can improve a pedal feel of an electric booster brake system.

Discussion of the Background

Recently, the use of an electric booster brake system has been expanded in order to implement a vacuum-free brake system for improving fuel efficiency, an active braking actuator such as an AEB (Autonomous Emergency Braking) system, and regenerative braking cooperation control of an electric vehicle.

In general, most of electric booster brake systems maintain the braking mechanism of an existing vacuum booster, but the electric booster brake systems have a different boosting mechanism from the vacuum booster. That is, instead of boosting a braking pressure to a differential pressure between air pressure and vacuum pressure like a vacuum booster, the electric booster brake systems boost a braking pressure through a force of an electric booster (or motor) using electrical energy.

the electric booster brake systems have a different boosting mechanism from the vacuum booster in that the electric booster brake systems boost a braking pressure through a force of an electric booster (or motor) using electrical energy.

The electric booster brake system may be divided into two kinds of types depending on whether a pedal simulator is mounted. The electric booster brake system having a pedal simulator mounted therein blocks a pedal force of a driver, which is generated when the driver steps on a brake pedal, and performs braking using only a force of the electric booster. The electric booster brake system steps on a brake pedal allows a driver to get a pedal feel similar to a pedal feel which an existing vacuum booster brake system had provided using a reaction force generated by a rubber damper or spring of the pedal simulator.

On the other hand, the electric booster brake system having no pedal simulator mounted thereon forms a pedal feel of a driver by causing a pedal force of the driver to cover a part of a braking force. For example, when the boosting ratio of the electric booster is 10:1, 10% of the entire braking force is covered by the pedal force of the driver, and 90% of the entire braking force is covered by the electric booster. That is, the electric booster brake system having no pedal simulator mounted therein forms a pedal feel of a driver by causing the pedal force of the driver to cover a part of the entire braking force.

The related art is disclosed in Korean Patent Publication No. 10-2008-0044300 published on May 20, 2008.

The electric booster brake system having a pedal simulator mounted thereon has a disadvantage in terms of cost and size, because it requires additional parts, such as a solenoid valve. However, the electric booster brake system having a pedal simulator mounted therein can easily form a pedal feel of a driver.

On the other hand, the electric booster brake system having no pedal simulator mounted therein may not easily form a proper pedal feel of a driver. The proper pedal feel may indicate a pedal feel which the existing vacuum booster brake system had provided. Drivers are accustomed to a brake feel and pedal feel which the existing vacuum booster brake system had provided. As described above, however, since the boosting mechanism of the vacuum booster is different from the boosting mechanism of the electric booster, the electric booster brake system having no pedal simulator mounted therein has difficulties in implementing a pedal feel which the existing vacuum booster brake system had provided.

The above information disclosed in this Background section is only for enhancement of understanding of the background of the inventive concept, and, therefore, it may contain information that does not form the prior art that is already known in this country to a person of ordinary skill in the art.

SUMMARY

Embodiments of the present invention are directed to a braking apparatus and a braking control method of a vehicle, which can secure a sensitive quality by providing a proper pedal feel to a driver in an electric booster brake system having no pedal simulator mounted therein.

In one exemplary embodiment, a braking apparatus of a vehicle may include: a first master cylinder configured to create hydraulic pressure as a brake pedal is pressed; a second master cylinder configured to create braking pressure through a piston which is pressed by the hydraulic pressure created by the first master cylinder and a nut moved by rotation of a motor; and a control unit, configured to: calculate a required displacement position of the nut based on a pedal stroke of the brake pedal, and update the required displacement position based on a displacement position of the nut at a dead stroke end point where the pedal stroke moves away from a dead stroke section of the first master cylinder.

In another exemplary embodiment, a braking control method of a vehicle may include: determining, by a control unit, whether a pedal stroke of a brake pedal is equal to or more than a preset threshold stroke; calculating, by the control unit, a required displacement position of the nut based on the pedal stroke when it is determined that the pedal stroke is equal to or more than the threshold stroke; determining, by the control unit, whether the pedal stroke has reached a dead stroke end position where a dead stroke of a first master cylinder is ended; and updating, by the control unit, the required displacement position based on the displacement position of the nut at a dead stroke end point at which the pedal stroke has reached the dead stroke end position when it is determined that the pedal stroke has reached the dead stroke end point.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
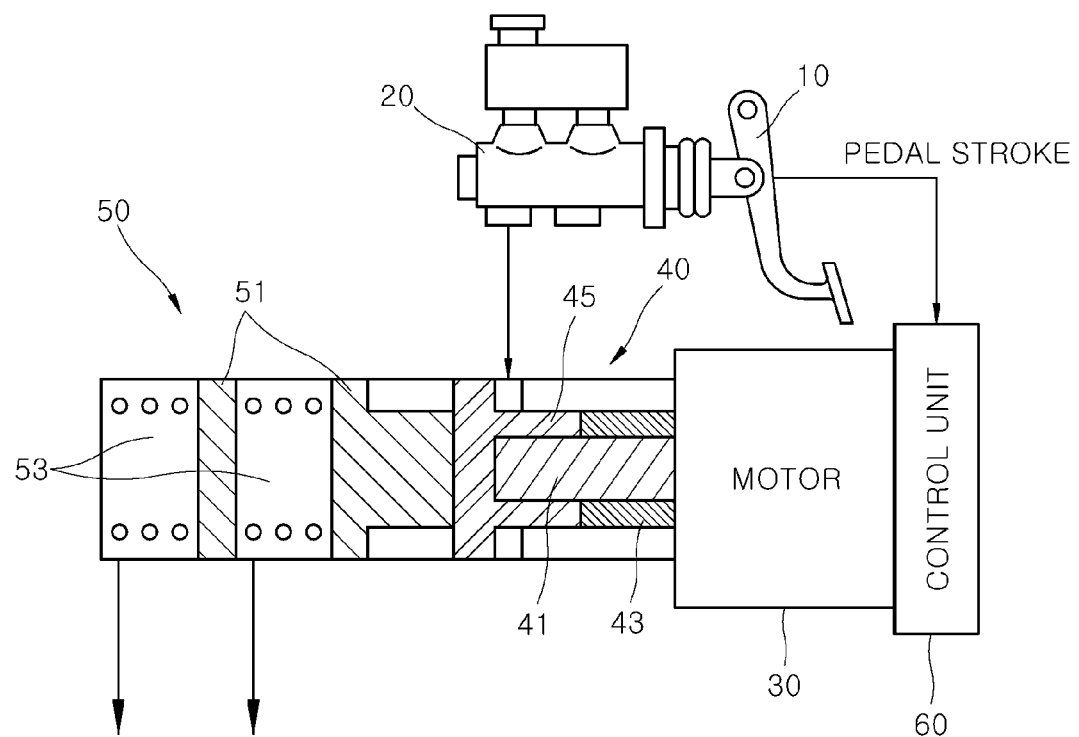
FIG. 1 is a configuration diagram illustrating a braking apparatus of a vehicle in accordance with an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise," "configure," "have," or the like, which are described herein, will be understood to imply the inclusion of the stated components, and therefore should be construed as including other components, and not the exclusion of any other elements.

Figure 2:
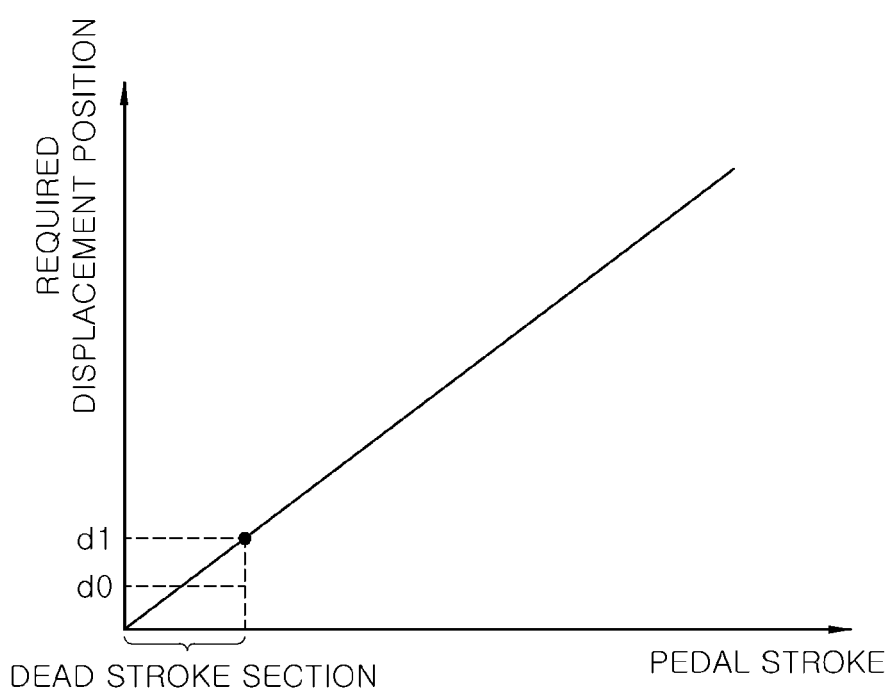
FIG. 2 illustrates the relation between a pedal stroke and a required displacement position of a nut in the braking apparatus of a vehicle in accordance with the embodiment of the present invention.
Figure 3:
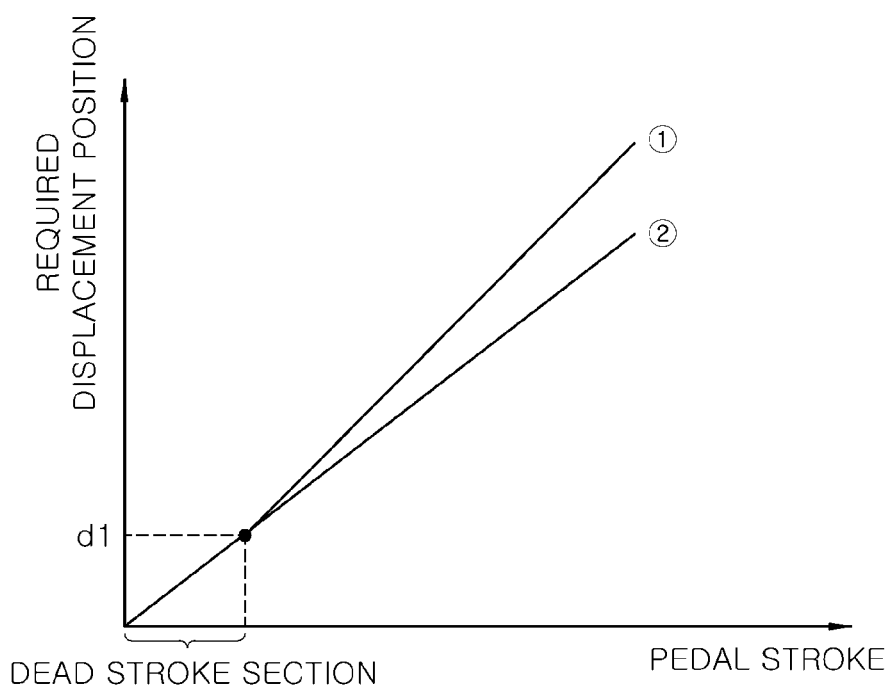
FIG. 3 comparatively illustrates a displacement position of the nut and the required displacement position of the nut when a driver does not get a pedal feel in the braking apparatus of a vehicle in accordance with the embodiment of the present invention.
Figure 4:
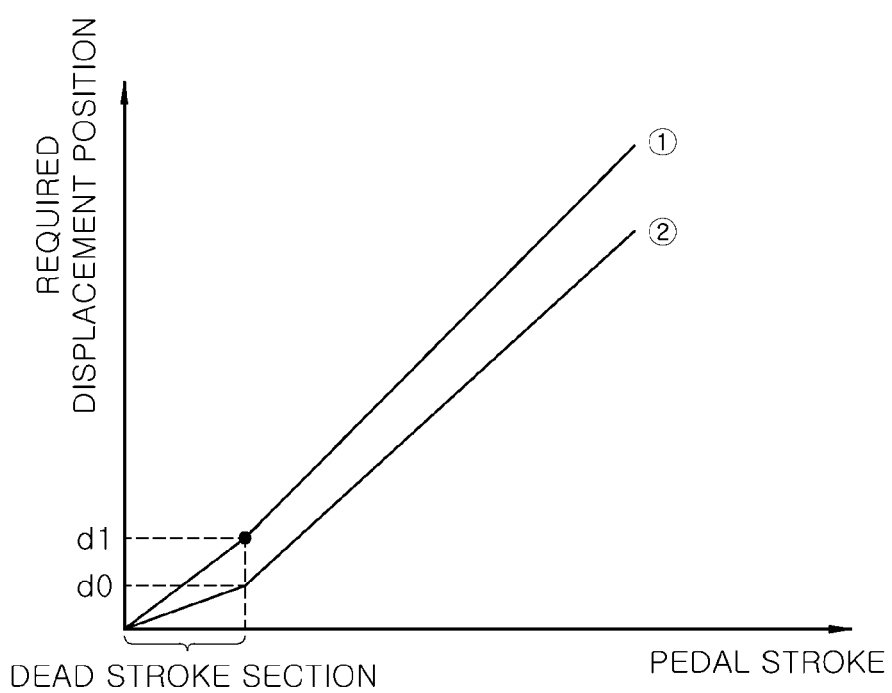
FIGS. 4 and 5 illustrate a behavior under an absolute standard and an actual behavior, when the nut does not reach the required displacement position at a dead stroke end point in the braking apparatus of a vehicle in accordance with the embodiment of the present invention.
Figure 5:
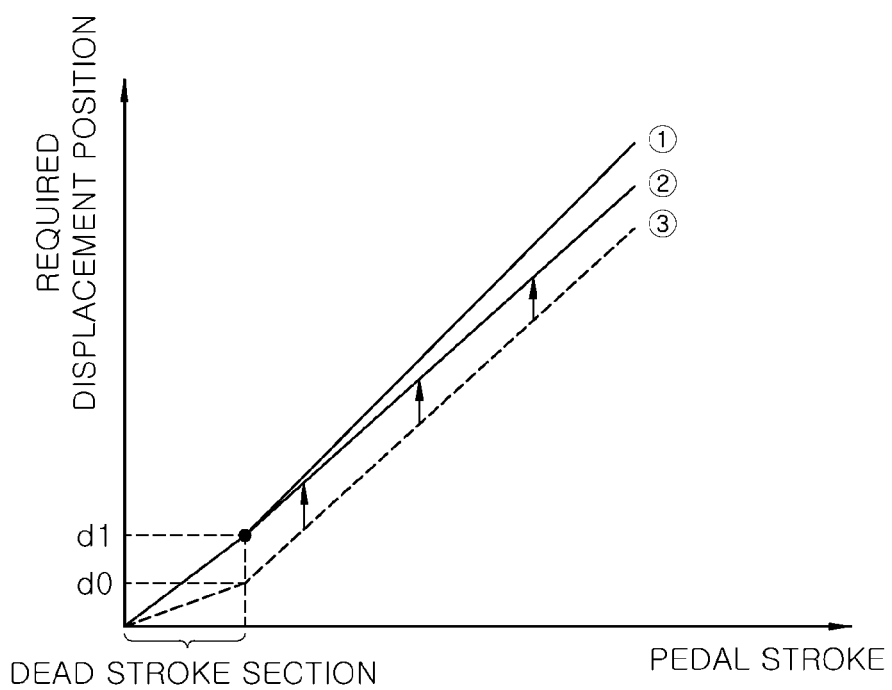
Figure 6:
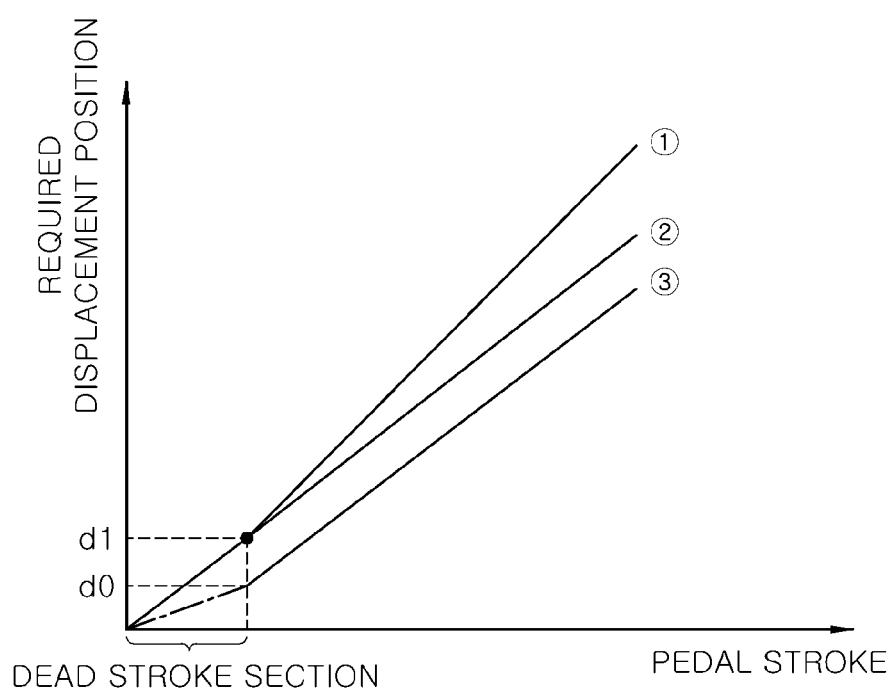
FIGS. 6 and 7 illustrate a process of updating the required displacement position in the braking apparatus of a vehicle in accordance with the embodiment of the present invention.
Figure 7:
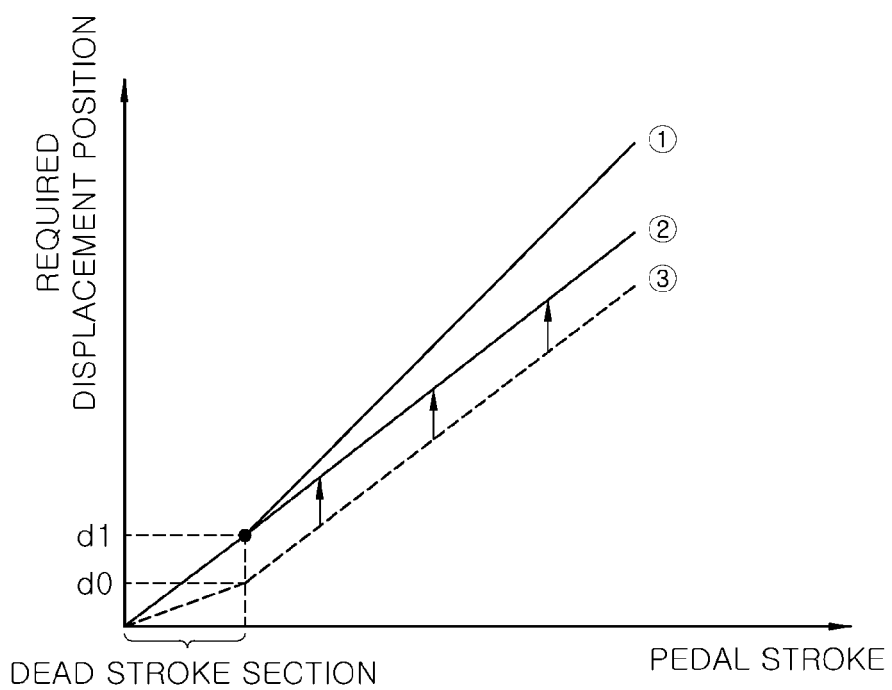
Figure 8:
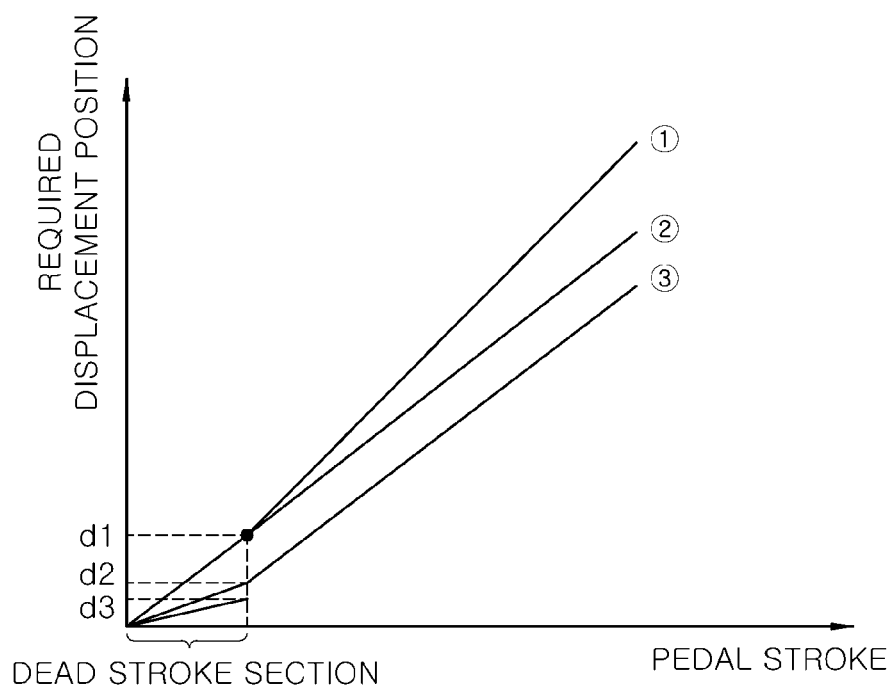
FIG. 8 illustrates a process of updating the required displacement position when a difference between a displacement position of the nut and the reference required displacement position exceeds a threshold value in the braking apparatus of a vehicle in accordance with the embodiment of the present invention.
Figure 9:
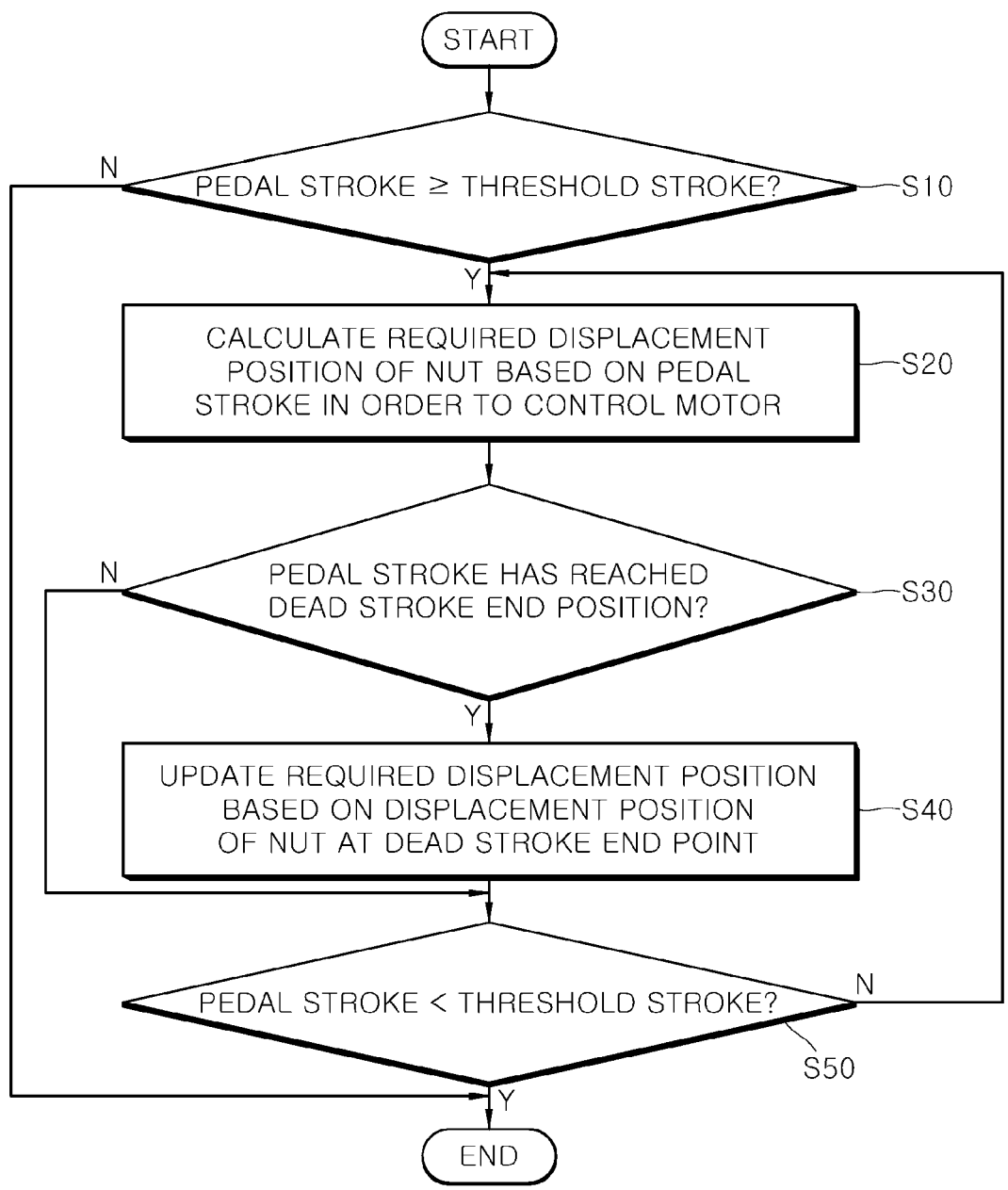
FIG. 9 is a flowchart illustrating a braking control method of a vehicle in accordance with an embodiment of the present invention.
Figure 10:
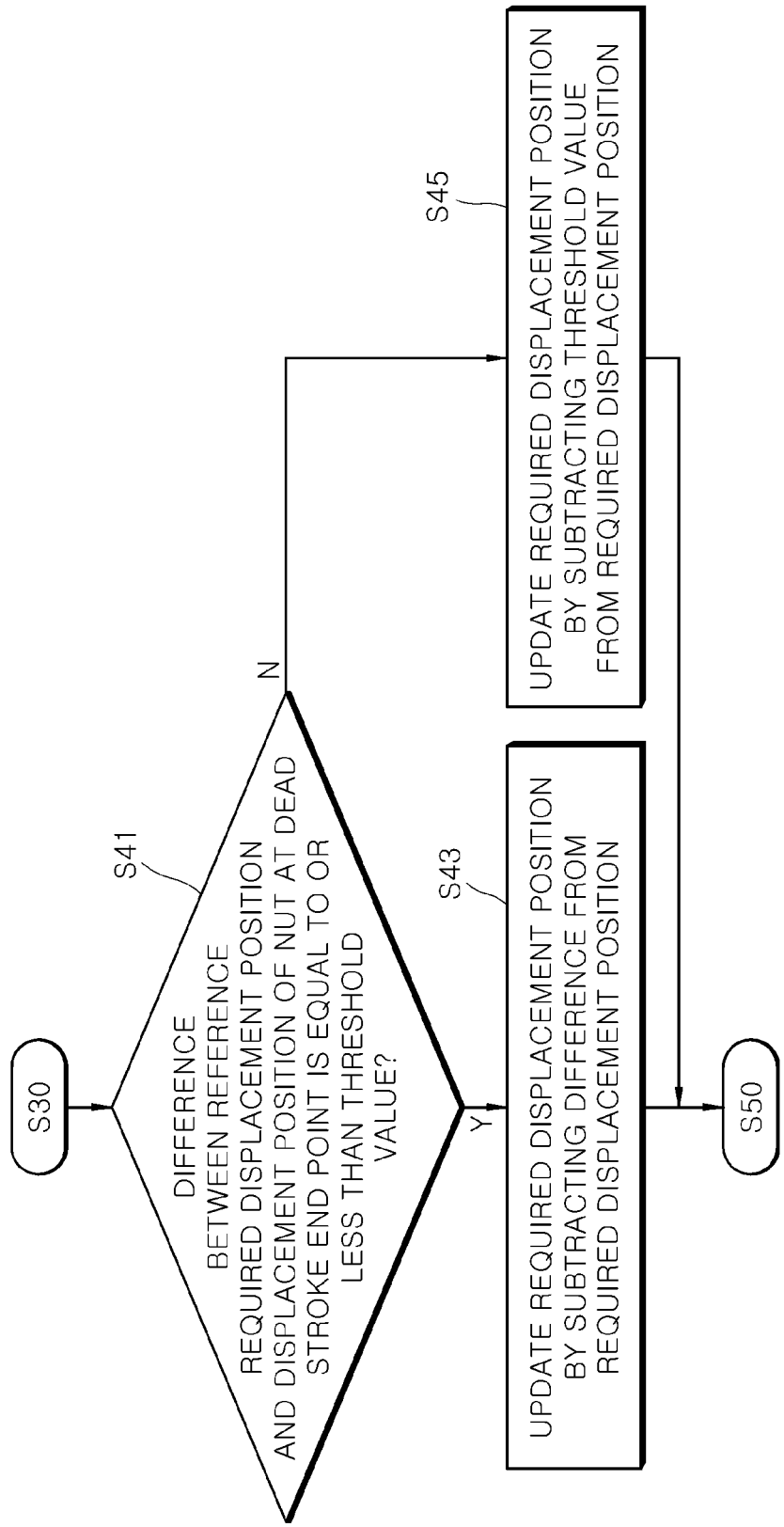
FIG. 10 is a flowchart illustrating a process of updating a required displacement position in the braking control method in accordance with the embodiment of the present invention.

FIG. 1 is a configuration diagram illustrating a braking apparatus of a vehicle in accordance with an embodiment of the present invention, FIG. 2 illustrates the relation between a pedal stroke and a required displacement position of a nut in the braking apparatus of a vehicle in accordance with the embodiment of the present invention, FIG. 3 comparatively illustrates a displacement position of the nut and the required displacement position of the nut when a driver does not get a pedal feel in the braking apparatus of a vehicle in accordance with the embodiment of the present invention, FIGS. 4 and 5 illustrate a behavior under an absolute standard and an actual behavior, when the nut does not reach the required displacement position at a dead stroke end point in the braking apparatus of a vehicle in accordance with the embodiment of the present invention, FIGS. 6 and 7 illustrate a process of updating the required displacement position in the braking apparatus of a vehicle in accordance with the embodiment of the present invention, FIG. 8 illustrates a process of updating the required displacement position when a difference between a displacement position of the nut and the reference required displacement position exceeds a threshold value in the braking apparatus of a vehicle in accordance with the embodiment of the present invention, FIG. 9 is a flowchart illustrating a braking control method of a vehicle in accordance with an embodiment of the present invention, and FIG. 10 is a flowchart illustrating a process of updating a required displacement position in the braking control method in accordance with the embodiment of the present invention.

Referring to FIG. 1, the braking apparatus of a vehicle in accordance with the embodiment of the present invention may include a first master cylinder 20, a braking force transfer unit 40, a second master cylinder 50, and a control unit 60. The first master cylinder 20 may form a hydraulic pressure as a brake pedal 10 is pressed, the braking force transfer unit 40 may transfer a braking force to the second master cylinder 50 through a push rod 45 which is not only pressed by the hydraulic pressure formed by the first master cylinder 20 but also pressed while a rotational motion of a motor 30 is converted into a linear motion, the second master cylinder 50 may form a braking pressure through an internal piston 51 pressed by the push rod 45, and the control unit 60 may calculate a required displacement position of a nut 43 based on a pedal stroke of the brake pedal 10, inputted from a pedal sensor (not illustrated), in order to control the motor 30.

In the present embodiment, a piston may be defined as a unit including the push rod 45 of the transfer unit 40 and the internal piston 51 of the second master cylinder 50. The internal piston 51 may include first and second internal pistons which are movably inserted into a cylinder body (not illustrated), and the first and second internal pistons may be separated from each other such that a plurality of hydraulic chambers 53 are formed in the cylinder body.

The hydraulic pressure of the first master cylinder 20, which is generated as a driver steps on the brake pedal 10, may press the push rod 45 of the braking force transfer unit 40, and the pressed push rod 45 may be moved to press the internal piston 51 of the second master cylinder 50. The hydraulic pressure of the first master cylinder 20, applied to the push rod 45, may indicate a braking force which is covered by a pedal force of the driver, for the entire braking force (braking pressure) formed by the second master cylinder 50.

The push rod 45 pressed by the hydraulic pressure of the first master cylinder 20 may be pressed by the nut 43 which is moved in the axial direction of a screw 41 while a rotational motion of the motor 30 is converted into a linear motion by the screw 41 and the nut 43, and then moved to press the internal piston 51 of the second master cylinder 50. At this time, the motor 30 and the screw 41 may be connected through a power transfer member such as a gear or belt (not illustrated), in order to convert the rotational motion of the motor 30 into the linear motion. The pressing force of the nut 43 for the push rod 45 may indicate a braking force which is covered by the motor 30, for the entire braking force formed by the second master cylinder 50.

Therefore, the braking force formed by the second master cylinder 50 may be set to the sum of the force of the motor 30 and the pedal force of the driver according to Equation 1 below.

Braking force=Force of motor+Pedal force of driver [Equation 1]

An electric booster brake system having a boosting ratio of 10:1 may be taken as an example for description. When it is assumed that the entire braking force which the control unit 60 calculates based on the pedal stroke received from the pedal sensor is 100%, the control unit 60 may control a current applied to the motor 30 such that the pressing force of the nut 43 to the push rod 45 becomes 90% of the entire braking force. In this case, since the pedal force of the driver is 10% of the entire braking force, the braking apparatus in accordance with the present embodiment may be considered to behave like a vacuum booster having a boosting ratio of 10:1.

However, for an actual behavior of the electric booster brake system, an influence of internal friction of the brake system, for example, friction between the piston and a sealing member for sealing the piston needs to be considered. Thus, Equation 1 may be expressed as Equation 2 below.

Braking force+Friction force=Force of motor+Pedal force of driver [Equation 2]

At this time, the friction force of Equation 2 may not have a constant value or a value proportional to the pedal stroke, but have a value which is frequently varied depending on a stick-slip behavior. For example, although the control unit 60 controls the current applied to the motor 30 such that 90% of the entire braking force is covered by the motor 30, the driver may not cover 10% of the braking force at all times, but cover a larger braking force depending on the magnitude of the friction force. For example, when the friction force is 5%, the driver needs to cover 15% of the entire braking force. That is, the current control method of the motor 30 may have a problem in that the pedal feel of the driver is degraded because the pedal force of the driver has a variable value depending on the magnitude of the friction force.

In the present embodiment, the control unit 60 may perform braking by applying a position control method instead of the current control method of the motor 30. That is, the control unit 60 may calculate a required displacement position of the nut 43 installed in the second master cylinder 50 based on the pedal stroke of the brake pedal 10, and control the motor 30 such that the nut 43 follows the calculated required displacement position.

The process in which the control unit 60 calculates the required displacement position of the nut 43 will be described in detail as follow.

The stiffness of the brake system may indicate the relation between a displacement of the piston of the master cylinder and a hydraulic pressure generated through the displacement of the piston, and the stiffness characteristic may be predefined according to the system specification. When the control unit 60 decides a target braking pressure based on the pedal stroke received from the pedal sensor, the control unit 60 can calculate the displacement of the piston of the master cylinder because the stiffness characteristic of the brake system is secured in advance.

The transfer system between the push rod 45 and the hydraulic pressure of the first master cylinder 20, formed by the pedal force of the driver, may also have a stiffness characteristic (for example, the stiffness of a sealing material). When the ratio of the hydraulic pressure of the first master cylinder 20 to the displacement of the push rod 45 is defined as a first stiffness, Equation 3 for controlling the position of the internal piston 51 may be derived.

Required displacement of internal piston−Required displacement of nut]Pedal force of driver/First stiffness [Equation 3]

Equation 3 shows that the pedal force of the driver decreases when the displacement of the nut 43 is large, and increases when the displacement of the nut 43 is small.

In Equation 3, the value of 'pedal force of driver/first stiffness' may be equal to a value obtained by dividing the pedal stroke by a pedal ratio, and the pedal ratio may have a specific value depending on a vehicle. Therefore, the value of 'pedal force of driver/first stiffness' may be proportional to the pedal stroke received from the pedal sensor. Thus, Equation 3 may be expressed as Equation 4 below.

Required displacement of nut]Required displacement of internal piston−Pedal stroke/Pedal ratio [Equation 4]

In Equation 4, 'displacement' has the same concept as 'displacement position', and the required displacement (displacement position) of the internal piston 51 is a parameter which the control unit 60 calculates based on the pedal stroke in order to form the final braking force (braking pressure). Therefore, Equation 4 may become a function of the required displacement position of the nut 43 with respect to the pedal stroke. Thus, the control unit 60 may calculate the required displacement position of the nut 43 based on the pedal stroke received from the pedal sensor, or calculate the required displacement position of the nut 43 based on the pedal stroke of the brake pedal 10, in order to control the motor 30. Therefore, the control unit 60 can perform position control to form a braking pressure through the second master cylinder 50.

So far, the position control of the control unit 60, that is, the process of calculating the required displacement position of the nut 43 to control the motor 30 has been described. Hereafter, a process of updating the required displacement position of the nut 43 according to a dead stroke of the second master cylinder 50 will be described.

First, a dead stroke section may indicate a section from the initial position to the position at which a sealing part of the piston of the first master cylinder 20 passes through a sealing member such as a seal cup. The initial position may indicate the position of the piston when the driver does not press the brake pedal 10. While the pedal stroke is present in the dead stroke section, the pedal force of the driver may not move the push rod 45. Thus, a braking pressure may not be formed in the dead stroke section, but formed after the pedal stroke escapes from the dead stroke section. That is, a pedal feel may be generated through the position control according to Equation 4, after the pedal stroke escapes from the dead stroke section. In the dead stroke section, a pedal feel is formed only by a sliding friction force or a restoring force of a return spring of the first master cylinder 20.

When the pedal stroke and the required displacement position of the nut 43, calculated through Equation 4, have the relation of a graph illustrated in FIG. 2, the nut 43 needs to be positioned at d1 in FIG. 2 at a point of time that the pedal stroke escapes from the dead stroke section (dead stroke end point). During sudden braking, however, the nut 43 may not reach d1 but be positioned at d0, while the pedal stroke reaches the dead stroke end position. Such a situation may occur due to a lack of response of the motor 30. Therefore, the driver may instantaneously get a heavy pedal feel, and the motor 30 may be rapidly operated after escaping the dead stroke section, in order to recover a position difference (d1−d0) of the nut 43, which is formed in the dead stroke section. In this case, since the pedal feel of the driver becomes light, the driver may feel a sense of incompatibility.

For understandings of the pedal feel of the driver, the pedal feel will be described in detail with reference to FIG. 3. When the displacement of the nut 43 in case where the driver does not get a pedal feel through position control is expressed as a graph ① of FIG. 3 and the required displacement position of the nut 43, calculated through Equation 4, is expressed as a graph ② of FIG. 3, a difference between the graphs ① and ② may correspond to a pedal feel which the driver can get.

The required displacement position (d1 of FIG. 2) of the nut 43 at the dead stroke end point may be defined as a reference required displacement position. When it is assumed that the displacement position of the nut 43 at the dead stroke end point does not reach the reference required displacement position, the displacement of the nut 43 may be rapidly increased by the motor 30 which is rapidly operated after escaping from the dead stroke section, in order to recover the value of d1−d0 from the dead stroke end point as illustrated in the graph ② of FIG. 5, compared to the behavior of the nut 43 under the absolute standard as illustrated in the graph ① of FIG. 4. Thus, the pedal feel of the driver may become much lighter. The graph ① of FIG. 4 may be based on the supposition that the nut 43 positioned at d0 at the dead stroke end point behaves according to the same slope as the graph ② of FIG. 3.

In a general vacuum-booster brake system, a driver may get a heavy pedal feel due to a time delay which occurs while atmospheric pressure is introduced through a mechanical valve. However, when the above-described embodiment is applied, the driver may get a heavy pedal feel at the initial stage of a braking operation, but get a light pedal feel for a longer period after escaping from the dead stroke section. Such a pedal feel may occur more frequently than in a vacuum booster brake system to which the BAS (Brake Assist System) is applied.

In order to solve the above-described problem, the control unit 60 in accordance with the present embodiment may calculate the required displacement position of the nut 43 based on the pedal stroke of the brake pedal 10 according to Equation 4, in order to control the motor 30. Furthermore, the control unit 60 may update the required displacement position based on the displacement position of the nut 43 at the dead stroke end point that the pedal stroke escapes from the dead stroke section of the first master cylinder 20. Specifically, when the displacement position of the nut 43 at the dead stroke end point does not reach the reference required displacement position, the control unit 60 may update the required displacement position.

As described above, the control unit 60 may update the required displacement position based on a difference between the reference required displacement position and the displacement position of the nut 43 at the dead stroke end point. That is, the control unit 60 may update the required displacement position by moving the required displacement position parallel by the difference between the reference required displacement position and the displacement position of the nut 43.

When the displacement position of the nut 43 in case where the driver does net get a pedal feel by the position control is expressed as a graph ① of FIG. 6 and the required displacement position of the nut 43, calculated through Equation 4, is expressed as a graph ② of FIG. 6, the required displacement position of the nut 43, which is updated in accordance with the present embodiment, may be expressed as a graph ③ (solid line) which is moved parallel by the difference value from the graph ②. Therefore, a difference between the displacement position of the nut 43 in case the driver does not get a pedal feel through position control and the displacement position of the nut 43 following the required displacement position may be formed as illustrated in FIG. 7. Thus, the intended pedal feel as illustrated in FIG. 2 may be provided to the driver.

In other words, although the difference of (d1−d0) is present between the reference required displacement position and the displacement position of the nut 43 at the dead stroke end point, the control unit 60 may subtract the difference from the required displacement position and update the required displacement position to have the same slope as the slope of the original required displacement position. Therefore, the control unit 60 can remove a sense of incompatibility which the driver may feel when the pedal feel becomes light due to the motor 30 which is rapidly operated to recover the difference of (d1−d0) after the dead stroke section.

In the present embodiment, the control unit 60 may update the required displacement position by subtracting the difference from the required displacement position only when the difference between the reference required displacement position and the displacement position of the nut 43 at the dead stroke end point is equal to or less than a preset threshold value. When the difference between the reference required displacement position and the displacement position of the nut 43 at the dead stroke end point exceeds the preset threshold value, the control unit 60 may not update the required displacement position or update the required displacement position by subtracting the threshold value from the required displacement position.

Referring to FIG. 8, when d1 represents the reference required displacement position, d2 represents a displacement position of the nut 43 at which a difference of (d1−d2) becomes the threshold value, and d3 represents a measured displacement position of the nut 43 at the dead stroke end point, the control unit 60 may update the required displacement position into a graph ③ obtained by subtracting the threshold value from the required displacement position, because a difference of (d1−d3) between the reference required displacement position and the displacement position of the nut 43 at the dead stroke end point exceeds the threshold value of (d1−d2). This may indicate that a subtraction for updating the required displacement position is limited to the threshold value, and the operation of the control unit 60 may be based on the viewpoint that the braking stability may be reduced when the braking performance of the vehicle is changed by frequent updates of the required displacement position, and a pedal feel during sudden braking may be different from a pedal feel in a general case. The threshold value may be designed in various manners depending on the specification of the brake system and a designer's intention, and preset in the control unit 60.

FIG. 9 is a flowchart illustrating a braking control method of a vehicle in accordance with an embodiment of the present invention, and FIG. 10 is a flowchart illustrating a process of updating the required displacement position in the braking control method in accordance with the embodiment of the present invention.

Referring to FIG. 9, the braking control method of a vehicle may begin with step S10 in which the control unit 60 determines whether a pedal stroke of the brake pedal 10 is equal to or more than the preset threshold stroke. The threshold stroke may indicate the lower limit value of the pedal stroke, at which braking control of the vehicle is started. The threshold stroke may be designed in various manners depending on the specification of the brake system and a designer's intention, and preset in the control unit 60.

When it is determined that the pedal stroke is equal to or more than the threshold stroke, the control unit 60 may calculate a required displacement position of the nut 43 based on the pedal stroke, in order to control the motor 30, at step S20. Since the process of calculating the required displacement position according to Equation 4 has been described above, the detailed descriptions thereof are omitted herein.

Then, the control unit 60 may determine whether the pedal stroke has reached a dead stroke end position where a dead stroke of the first master cylinder 20 is ended, at step S30.

When it is determined that the pedal stroke has reached the dead stroke end position, the control unit 60 may update the required displacement position based on the displacement position of the nut 43 at a dead stroke end point at which the pedal stroke has reached the dead stroke end position, at step S40. At this time, the control unit 60 may update the required displacement position when the displacement position of the nut 43 at the dead stroke end point does not reach the reference required displacement position. Specifically, the control unit 60 may update the required displacement position based on a difference between the reference required displacement position and the displacement position of the nut 43 at the dead stroke end point.

Referring to FIG. 10, step S40 will be described in detail as follows. When the difference between the reference required displacement position and the displacement position of the nut 43 at the dead stroke end point is equal to or less than the preset threshold value at step S41, the control unit 60 may update the required displacement position by subtracting the difference from the required displacement position at step S43. When the difference between the reference required displacement position and the displacement position of the nut 43 at the dead stroke end point exceeds the threshold value at step S41, the control unit 60 may update the required displacement position by subtracting the threshold value from the required displacement position at step S45.

After step S40 is performed or when it is determined at step S30 that the pedal stroke did not reach the dead stroke end position, the control unit 60 may determine that the pedal stroke is less than the threshold stroke at step S50. When it is determined that the pedal stroke is less than the threshold stroke, the control unit 60 may end the braking control. On the other hand, when the pedal stroke is equal to or more than the threshold stroke, the control unit 60 may return to step S20.

In accordance with the present embodiments, the braking apparatus and the braking control method can improve a pedal feel of a driver without an additional part such as a pedal simulator, thereby improving the cost competitiveness. Furthermore, since the position control method is applied instead of a current control method of a motor, the braking apparatus and the braking control method can remove a problem that a pedal feel of a driver is degraded due to a friction force between internal members in the braking apparatus, and secure a sensitive quality by optimizing the pedal feel of the driver.

The control unit 60 and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like. In this manner, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. As such, control unit 60 and/or one or more components thereof may include or otherwise be associated with one or more memories (not shown) including code (e.g., instructions) configured to cause the control unit 60 and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire, and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CDRW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Although preferred embodiments of the invention have been disclosed for illustrative purposes, those skilled in the art will appreciate that various modifications, additions, and substitutions are possible, without departing from the scope and spirit of the invention as defined in the accompanying claims.

What is claimed is:

1. A braking apparatus of a vehicle, comprising:
  a first master cylinder configured to create hydraulic pressure as a brake pedal is pressed;
  a second master cylinder configured to create braking pressure through a piston which is pressed by the hydraulic pressure created by the first master cylinder and a nut moved by rotation of a motor; and
  a control unit, configured to:
    calculate a required displacement position of the nut based on a pedal stroke of the brake pedal, and update the required displacement position based on a displacement position of the nut at a dead stroke end point where the pedal stroke moves away from a dead stroke section of the first master cylinder.

2. The braking apparatus of claim 1, wherein the control unit is further configured to update the required displacement position when the displacement position of the nut at the dead stroke end point does not reach a reference required displacement position, wherein the reference required displacement position comprises a required displacement position at the dead stroke end point.

3. The braking apparatus of claim 2, wherein the control unit is further configured to update the required displacement position based on a difference between the reference required displacement position and the displacement position of the nut at the dead stroke end point.

4. The braking apparatus of claim 3, wherein the control unit is further configured to update the required displacement position by subtracting the difference from the required displacement position when the difference is equal to or less than a preset threshold value.

5. The braking apparatus of claim 3, wherein the control unit is further configured to update the required displacement position by subtracting a preset threshold value from the required displacement position when the difference exceeds the threshold value.

6. A braking control method of a vehicle, comprising:

determining, by a control unit, whether a pedal stroke of a brake pedal is equal to or more than a preset threshold stroke;

calculating, by the control unit, a required displacement position of the nut based on the pedal stroke when it is determined that the pedal stroke is equal to or more than the threshold stroke;

determining, by the control unit, whether the pedal stroke has reached a dead stroke end position where a dead stroke of a first master cylinder is ended; and updating, by the control unit, the required displacement position based on the displacement position of the nut at a dead stroke end point at which the pedal stroke has reached the dead stroke end position when it is determined that the pedal stroke has reached the dead stroke end point.

7. The braking control method of claim 6, wherein, in the updating of the required displacement position, the control unit updates the required displacement position when the displacement position of the nut at the dead stroke end point does not reach a reference required displacement position, and wherein the reference required displacement position comprises a required displacement position at the dead stroke end point.

8. The braking control method of claim 7, wherein, in the updating of the required displacement position, the control unit updates the required displacement position based on a difference between the reference required displacement position and the displacement position of the nut at the dead stroke end point.

9. The braking control method of claim 8, wherein, in the updating of the required displacement position, the control unit updates the required displacement position by subtracting the difference from the required displacement position when the difference is equal to or less than a preset threshold value.

10. The braking control method of claim 8, wherein, in the updating of the required displacement position, the control unit updates the required displacement position by subtracting the threshold value from the required displacement position when the difference exceeds the preset threshold value.

* * * * *